United States Patent
Jones

[11] Patent Number: 5,960,614
[45] Date of Patent: Oct. 5, 1999

[54] TORSION HITCH FOR TRACTOR WITH FENCE MOWER

[76] Inventor: Hollis H. Jones, 1453 Walnut St., Wheatland, Wyo. 82201

[21] Appl. No.: 08/898,775

[22] Filed: Jul. 23, 1997

[51] Int. Cl.⁶ .................................................. A01D 34/24
[52] U.S. Cl. .......................... 56/15.2; 56/14.9; 172/245; 37/403
[58] Field of Search ..................... 56/15.1, 15.2, 56/15.5, 15.6, 15.7, 235, 315, 234, DIG. 14; 172/245, 433; 37/403

[56] References Cited

U.S. PATENT DOCUMENTS

| | | | |
|---|---|---|---|
| 3,701,238 | 10/1972 | Hintze, Jr. | 56/10.4 |
| 3,754,383 | 8/1973 | Burrough et al. | 56/14.4 |
| 3,949,539 | 4/1976 | Cartner | 56/15.5 |
| 4,001,956 | 1/1977 | Wilson et al. | 172/245 |
| 4,181,181 | 1/1980 | Old | 172/443 |
| 4,286,918 | 9/1981 | Shannon | 172/443 |
| 4,432,192 | 2/1984 | Maier et al. | 56/15.7 |
| 4,648,620 | 3/1987 | Nuss | 280/689 |
| 4,697,405 | 10/1987 | DeWitt et al. | 56/10.4 |
| 4,773,666 | 9/1988 | Koberlein et al. | 172/443 |
| 4,901,508 | 2/1990 | Whatley | 56/10.4 |
| 4,956,965 | 9/1990 | Parsons, Jr. | 56/15.1 |
| 5,035,107 | 7/1991 | Scarborough | 56/10.4 |
| 5,060,463 | 10/1991 | Jones | 172/443 |
| 5,129,218 | 7/1992 | Youngberg et al. | 56/15.8 |
| 5,146,737 | 9/1992 | Gantzer | 56/DIG. 14 |
| 5,199,249 | 4/1993 | Wattron et al. | 56/15.5 |
| 5,337,544 | 8/1994 | Lauritsen | 56/15.7 |
| 5,368,118 | 11/1994 | Hoefle | 180/89.12 |
| 5,419,104 | 5/1995 | Higdon | 56/15.2 |
| 5,423,165 | 6/1995 | Walch et al. | 56/DIG. 14 |
| 5,425,224 | 6/1995 | Downey et al. | 56/15.8 |
| 5,483,789 | 1/1996 | Gummerson | 56/15.6 |
| 5,528,889 | 6/1996 | Kure et al. | 56/15.6 |

FOREIGN PATENT DOCUMENTS

| | | | |
|---|---|---|---|
| 394830 | 10/1990 | European Pat. Off. | 56/DIG. 14 |

*Primary Examiner*—Thomas B. Will
*Assistant Examiner*—Arpad Fabian Kovacs
*Attorney, Agent, or Firm*—John O. Mingle

[57] ABSTRACT

A system consisting of a versatile hitch attached to a tractor which positions a ground-based implement, such as a mower, in front or to either side of the tractor. The hitch cushions or dampens movement using a torsional component over rough ground by the tractor allowing the implement to traverse a near parallel ground direction. The mower design mows either normally over open ground or in restricted locations, such as around fences supported by posts.

6 Claims, 5 Drawing Sheets

TORSION HITCH FOR TRACTOR WITH FENCE MOWER

BACKGROUND OF INVENTION

1. Field of Invention

The present invention relates to a device for a universal ground-following tractor hitch including a special fence mower.

2. Background

Tractors are often employed with many accessory implements, such as mowers, tillers, rakes, feeders, plows, grapples, post-hole diggers, post drivers, drillers, cultivators, spray booms, dozer blades, and similar apparatuses.

In the case of mowers many improvements are designed to embrace the situation of mowing around and close to fences, fence posts, guardrails, and other vertical objects that impair clear pathway mowing whether for highway right-of-ways, parks, commercial properties, or general agriculture uses. The efficiency improvement in not having to employ a separate hand controlled trimmer is obvious.

Often a system to handle mowing around a fence with posts is designed to mow simultaneously on both sides of the fence. That is, some mechanical arrangement extending over the fence is provided to position two mower heads, one on each side, of the fence while the tractor moves along parallel to the fence row. This arrangement is expensive while subject to much maintenance and is difficult to control on rough ground, such as is common along roadways.

Various hitch assemblies are employed to serve as an intermediate mechanism between the tractor and the operating implement. Often these hitches utilize the power takeoff, usually referred to as the PTO, system of the tractor, sometimes directly and sometimes to operate a transitional power unit, such as a hydraulic system or an electrical generator. For instance, mowers often use belt-driven assemblies coming directly from the PTO, but they also are designed with hydraulic or electrical motors to drive the mower blades and these systems are powered by the tractor in some manner. However an alternate arrangement is to provide a trailer system containing a separate engine to drive the implement.

Another important situation occurs depending upon the ease of installing and removing a tractor hitch as well as its transition in use between several implements. Thus a general purpose or universal, versatile forward hitch is needed such as the subject invention provides.

One difficulty in employing agriculture implements occurs when rough ground is encountered. Of course, the operator can always manually adjust operating conditions for rough ground situations, but this is time consuming and often produces unsatisfactory results. The subject invention compensates for rough ground situations as part of the hitch system which employs various applications of torsional links.

Related United States patents include:

| No. | Year | Inventor |
| --- | --- | --- |
| 5,425,224 | 1995 | Downey et al. |
| 5,129,218 | 1992 | Youngberg et al. |
| 5,035,107 | 1991 | Scarborough |
| 4,901,508 | 1990 | Whatley |
| 4,697,405 | 1987 | DeWitt et al. |
| 4,181,181 | 1980 | Old |

| No. | Year | Inventor |
| --- | --- | --- |
| 3,754,383 | 1973 | Burrough et al. |
| 3,701,238 | 1972 | Hintze, Jr. |

Referring to the above list, Downey et al. disclose a conventional mower deck with a moveable in-and-out carriage positioned under a tractor so as to mow close to fences.

Youngberg et al. disclose the use of torsional suspension bars on the tractor frame to tilt it for use on sloping terrain.

Scarborough discloses a rotary lawn mower having an arm with a moveable trimming attachment so as to mow close to fences.

Whatley discloses a mower using a horizontal boom with a pivotal mower head attached so as to mow close to fences and hill sides. The mower head has three separate cutting heads arranged around a central shaft which rotates only by impacting a fence post.

DeWitt et al. disclose a trailer mounted mower with multiple mower heads. One set of moveable mower heads extends on the outside of a fence row. Another moveable mower head is employed on the inside of the fence row.

Old discloses a three-point hitch to operate an implement on the front of a tractor and is designed to minimize side-to-side sway of the tractor.

Burrough et al. disclose a torsional spring suspension for a sickle-bar mower designed to raise it for transport.

Hintze, Jr. discloses a four element sickle-bar cutting mower having the ability to rotate only when impacted so as to partly curl around a fence post.

SUMMARY OF INVENTION

The objectives of the present invention include overcoming the above-mentioned deficiencies in the prior art. The subject invention utilizes a system consisting of a versatile hitch employing a torsional component attached to a tractor which positions a ground-based implement, in front or to either side of the tractor. One advantage of the hitch is that it cushions movement over rough ground by the tractor allowing the implement to traverse a near parallel ground direction. A common ground-based implement is a mower setup which is designed to mow either normally over open ground or in restricted locations, such as around fences supported by posts.

DETAILED DESCRIPTION OF INVENTION

In usage of transportable power systems, like a tractor, generally the key element is coupling some type of ground-based implement or other apparatus to said tractor in a manner so as to efficiently perform the desired work product. A common ground-based implement is a mowing apparatus which mows a given swath of grass or mows around various obstacles, such as the vertical posts of a fence.

There are many other implements that couple well to tractors; however, the subject invention targets a versatile hitch employed with a mower.

The hitch has many actual configurations depending upon the whim of the designer. Yet such hitch needs some basic elements to perform well. First the hitch is substantially structural so as to hold in the proper position whatever implement is employed. A heavy implement requiring a large force, such as a plow, requires a more structurally substantial hitch than does one designed for use only with rakes. An additional important feature is that the hitch is easily attached and removed from the tractor; therefore, although welding is likely easy and structurally sufficient, it is more prudent to employ a bolting or equivalent connection.

In the subject invention when a mower head is employed, a moderate structural hitch is adequate; however, such structural integrity is alterable if vibrational problems occur during operation.

The term tractor as employed is this specification is generic for a transportable power system and so would include, besides common tractors, such moving apparatuses as forklifts, pickups, trucks with special trailers, and other similar items.

Figure 1:
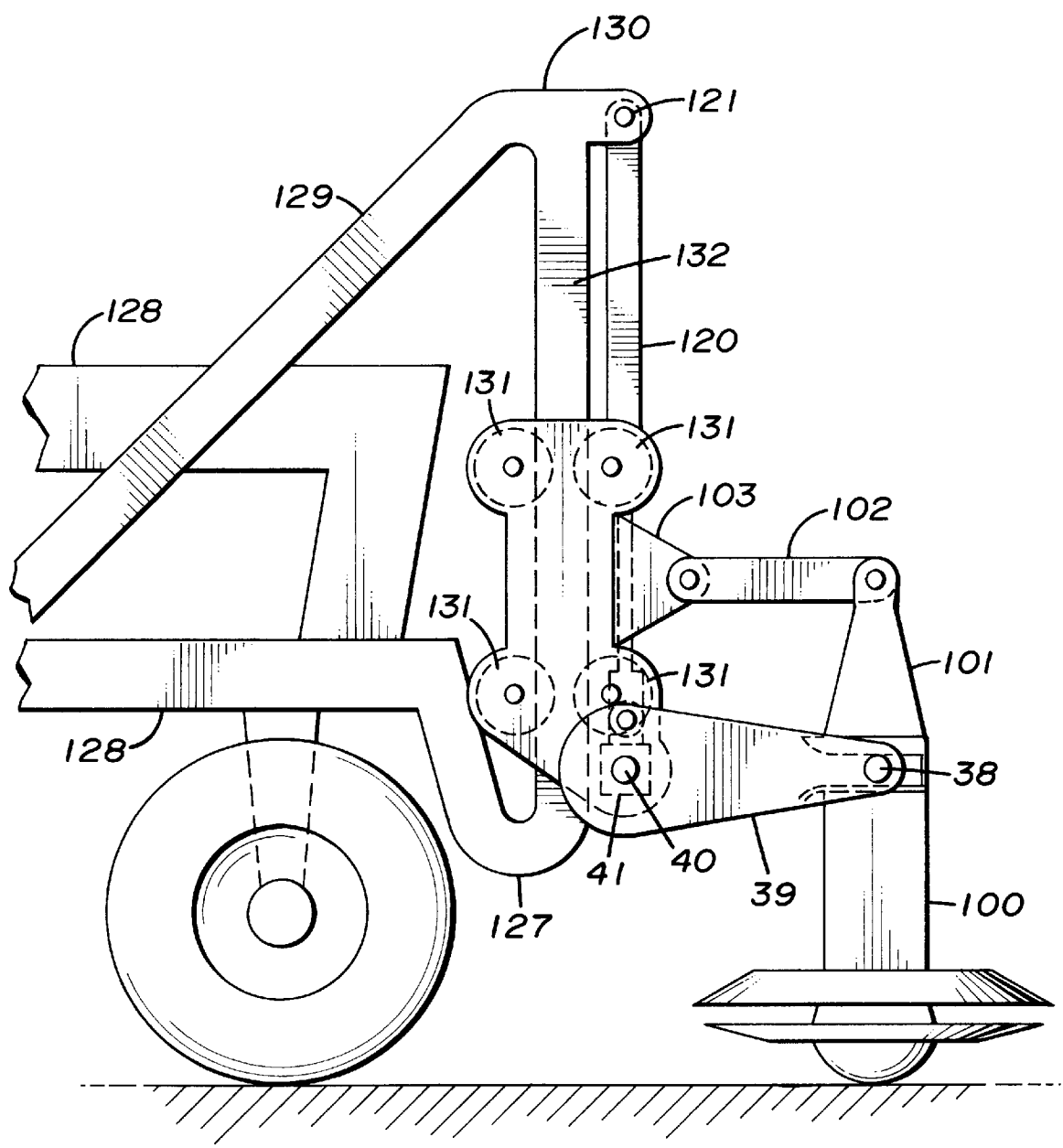
FIG. 1 shows the hitch attached to tractor positioning a mower unit.
Figure 3:
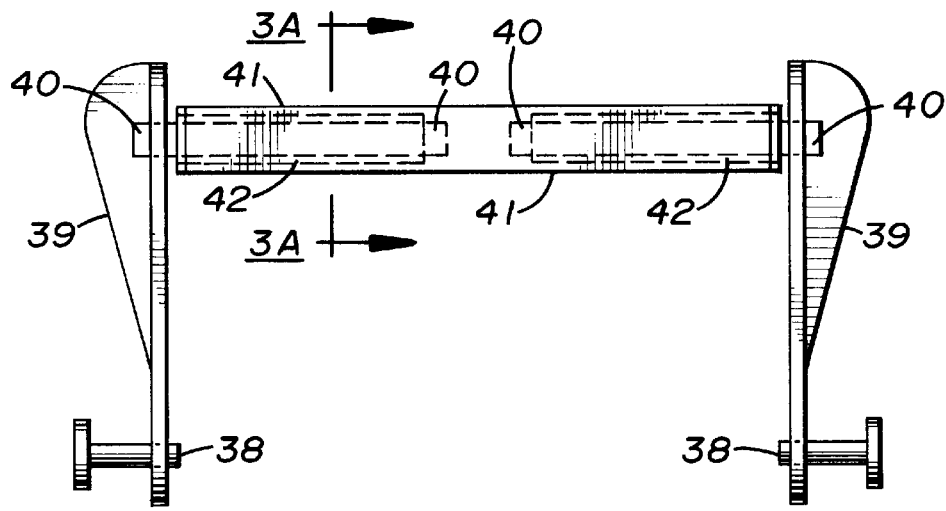
FIGS. 3 and 3A show a rubber torsional axial system as part of the hitch.
Figure 3A:
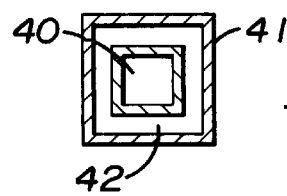
Figure 4:
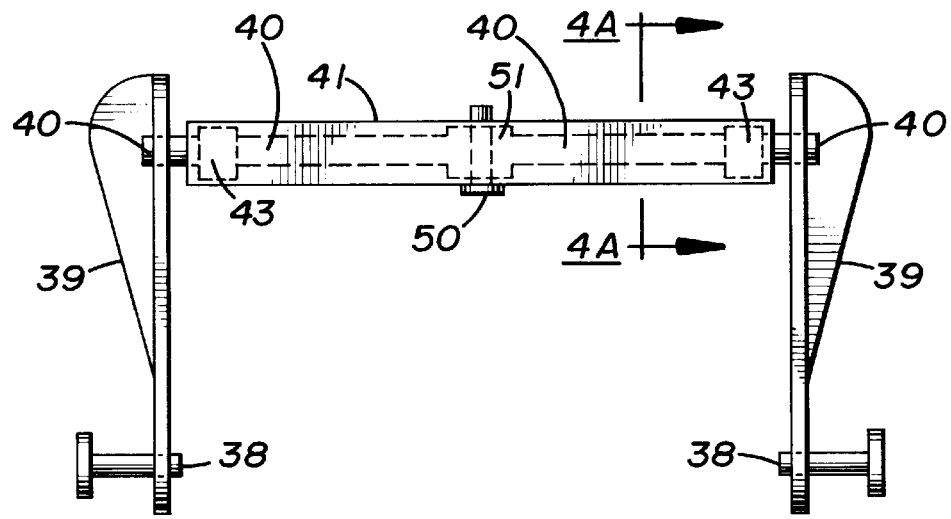
FIGS. 4 and 4A show a torsional bar system as part of the hitch.
Figure 4A:
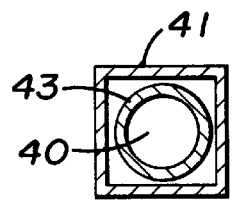
Figure 5:
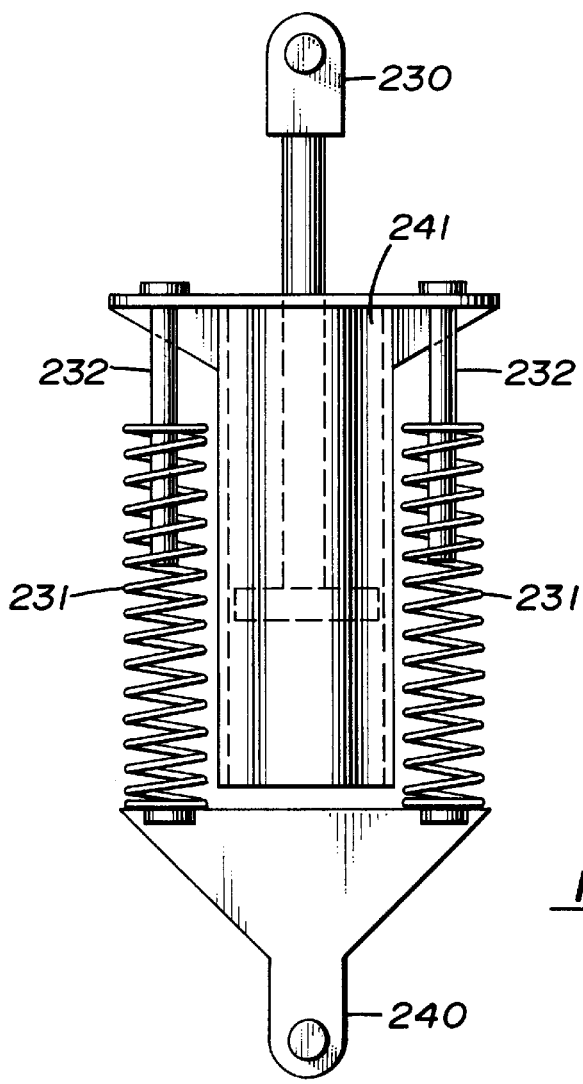
FIG. 5 shows a side view of torsional springs system as part of the hitch.

FIG. 1 details a typical tractor front end with the hitch attached along with a front mounted mower. The front structural section 128 of tractor has attached an upper structural brace 129 and a lower one 127. Connecting the two is a vertical hitch brace 132 upon which the hitch-implement pivotal connection 103 rides up and down by the use of rollers 131 and allows vertical adjustment. Components 127, 129, 132, 103, and 131 represent a longitudinally adjustable assembly. The brace 102 connects to the top of the implement 101 while the two braces 39 attach to either side of the implement. The mower as shown is a conventional mower system 100, but power connecting lines are not shown. The flexible dampening mechanism or torsional system 41 is shown in this instance as a metal bar 40 but also is potentially torsional bars, torsional springs, rubber torsional axials and combinations thereof, as shown in FIGS. 3, 4, and 5. A pivotal brace 120, with pin 121, governs the movement of the hitch connection in positioning it for appropriate mowing and this is commonly performed with a conventional hydraulic system, which is not shown, although other equivalent control and power systems are employable.

The second element of the hitch is the flexibility to position the implement where it is needed. Depending upon the actual implement, this is likely in any direction from the tractor, that is, either side or front or back. In the subject invention using a mower head, the most convenient hitch operates to either side and in front. In order to obtain the needed flexibility the hitch requires a movable boom or other adjustable structural platform, and this in turn requires a mechanical, hydraulic or pneumatic power assist to perform the actual adjustment. Of course, any mechanical situation is likely hand driven or motor driven. In all instances some auxiliary power unit is required and this often is run by the tractor engine, although a supplemental power unit platform separate from the tractor is employable. In many instances the PTO of the tractor is employed. In the subject invention it is expected to employ a power unit driven by the tractor engine while the moving platform is in the form of a longitudinally adjustable setup, such as an expanding or telescoping boom.

Figure 2:
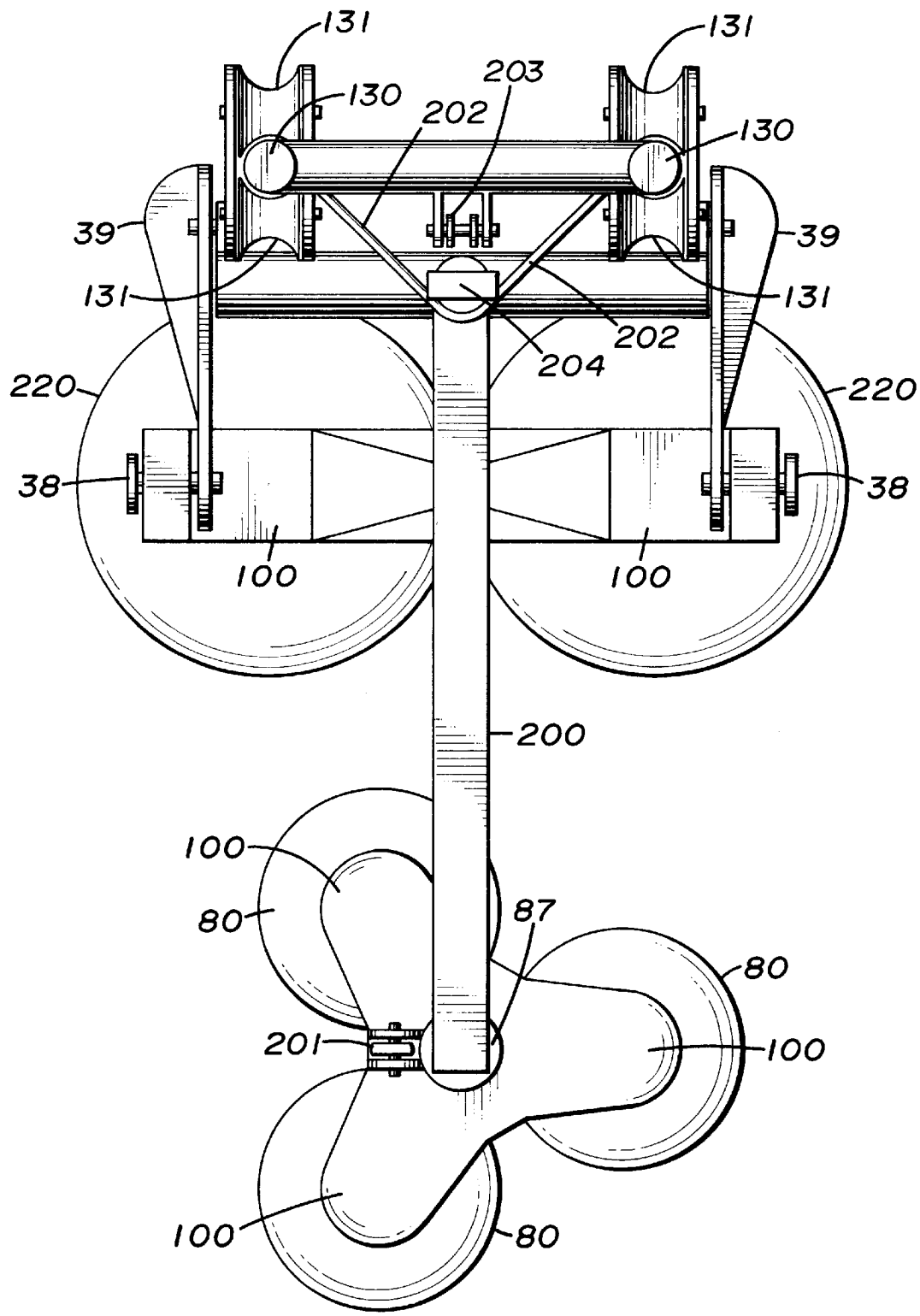
FIG. 2 shows a top view of the hitch assembled with two separate mover implements.

FIG. 2 shows a complex mowing apparatus mounted on this subject hitch and is composed of a two fixed mower assemblies 220 directly in front of the tractor and mounted with pins 38 while a third mower unit of tripartite form 80 is mounted on a swinging boom 200, thus it is useful either in the immediate front or on either side area of the tractor, and is connected by pin 201 or equivalent arrangement allowing rotation with a bearing 87. Mower system 100 is likely hydraulically powered but the conventional hydraulic lines are not shown. The upper boom connection 204 attaches to the vertically movable hitch structure 130, which slides on rollers 131, by braces 202. Other components are identified in FIG. 1.

Another necessary component of the hitch is the actual mechanism between the structural part of the hitch and the implement it directs. In some instances this is nothing more than a fixed structural segment, such as bolting the implement to the hitch. While other times a pin and sleeve mechanism allows a needed turning ability, particularly if the implement is pulled. In the subject invention this connection between the implement and hitch is important and is likely able to compensate when the tractor runs over rough ground. Further it is recognized that different implements represent different dynamic loadings for the hitch. Since the subject invention employs a mower head as a typical implement, which may vary considerable in design and weight, this connection is adjustable.

One of the most convenient modes of connecting the hitch to the implement is to employ a torsional component. A torsional system is composed of some component that is installed under stress, often of a rotational form, in order to allow recoverable rotatable and longitudinal movement. Thus structural torsional components are potentially, but not limited to, prestressed metal bars and springs. Additionally a torsional system is composed of a force absorbing mass or masses of material, such as stiff rubber, which is compressed by rotatable movement of some structural member, such as a metal axial, but tends to return to its original shape when such compression is released. In the subject invention one or more torsional components of any type are employable.

FIGS. 3 and 4 show two different torsional setups 41 and either works well with the subject hitch. In FIG. 3 a hard rubber square axial 42 acts as the torsional device which has a confined square metal axial 40 protruding through it. This setup restricts and cushions any action, due to implement movement, of the hitch connecting arms 39. As shown in FIG. 3 such a rubber torsional axial is required for each implement connector. Such a hard rubber torsional axial is adjusted by changing the nature of the rubber material so as to dynamically tune it to the ground-based implement employed.

In FIG. 4 a similar torsional setup is shown utilizing a metal torsional bar 40 which is held by a bearing 43 and adjusted in torsion by a clamp 51 and pin 50.

Another interesting torsional application is one or more large coiled springs. A mounted coiled spring is a torsion member when rotation is considered; however, it is additionally torsional in tension if mounted partially extended. In the subject invention when torsional springs are employed, one or a plurality are employable. Multiple springs are often easier to adjust in overall tension to better dynamically balance the load as a result of the weight of the attached implement.

FIG. 5 shows a partially encompassed said longitudinally adjustable assembly attached to a stretchable load-bearing cover consisting of a coiled spring setup where the coiled spring 231 surrounds a hydraulic cylinder 241, but conventional hydraulic lines are not shown, being employed to position the hitch assembly which is attached to the lower collar 240 while the upper collar 230 bolts to the upper hitch connector 121 as shown in FIG. 1. Bolts 232 are employed to dynamically tune the spring tension to that of the utilized ground-based implement. If the spring is fastened in rotational tension, it also acts as a torsional spring setup.

Figure 6:
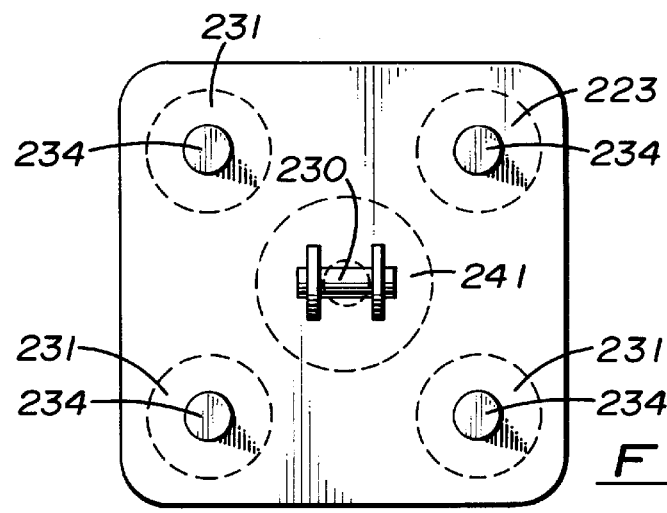
FIG. 6 shows a top view of torsional springs system as part of the hitch.

FIG. 6 is a top view of the coiled spring of FIG. 5 except that four small springs 234 are employed rather than one large spring.

The subject invention represents a hitch mounted on a tractor containing a power system for controlling a ground-based implement, comprising a longitudinally adjustable assembly, working in conjunction with said power system, which has sufficient capacity to handle movement of said ground-based implement. This longitudinally adjustable assembly is conveniently selected from the group consisting of a hydraulic piston and cylinder mechanism, an electro-hydraulic arrangement, a mechanical screw mechanism, an electro-mechanical screw mechanism, a winch mechanism, an electro-mechanical winch mechanism, a mechanical crank arm, and combinations thereof.

Next is means for providing a flexible dampening mechanism. In one configuration this is a stretchable load-bearing cover partially encompassing said assembly, which is a type of spring torsional system, wherein the upper portion of said cover is structurally attached to the movable structure of said assembly. Said stretchable load-bearing cover further comprises being selected from the group consisting of a spring setup, a hydraulic setup, a pneumatic setup, and combinations thereof. Such a spring setup is likely one large torsional coiled spring or several smaller ones. All such assemblies normally operate in a tension mode and are firmly attached to said assembly. This attachment is conveniently positioned at such location to allow an appreciable length of said assembly to dynamically stabilize the setup.

A different configuration for a flexible dampening mechanism could involve additional torsional dampening, where a torsional device is, but not necessarily limited to, systems involving torsional bars and rubber torsional axials. In most instances of torsional dampening, adjustment of the stiffness occurs by changing the degree of initial torsional stress inherent in the system. However in the case of a rubber torsional axial system, changing the hardness of the rubber component material changes its dampening response.

Next is means for structurally pivotally connecting said setup to said tractor. This pivot is commonly a form of universal joint, which is potentially as simple as a hinge, that is structurally sufficient to support the combined mechanical load of the assembly and the implement. One part of the universal joint represents a connection to the longitudinally adjustable assembly while the other connects to a permanent part of the tractor or some structure member attached to the tractor for this purpose.

Then is needed means for structurally connecting the lower portion of said cover to said ground-based implement. Since this must connect a variety of implements, it is potentially a universal joint, but often is much simpler such as a plain U-connection. This connection holds the assembly in place to not allow uncontrolled sideways movement as well as provides a removable attachment to the implement. In the case of a torsional system, it is mounted between the moveable structure of the longitudinally adjustable assembly and the implement and tends to dynamically stabilize movement particularly caused by rough ground.

Next occurring is means for structurally connecting said ground-based implement to said tractor by employing a substantially vertical sliding mechanism which acts as a vertical support. This sliding mechanism is convenient to stabilize the implement as well as allowing vertical movement of said implement when the longitudinally adjustable assembly is engaged to change the vertical height of said implement. Depending upon the design of the implement, this stabilizing bar may attach directly to the implement or it may attach to the longitudinally adjustable assembly moving portion, or in the case of a torsional system, to its fixed portion. This moving mechanism, while often a sliding segment, additionally is formed by employing a series of rollers to enclose the fixed structural member. The rollers turn as the vertical position of the ground-based implement is changed. Further this vertical sliding mechanism is positioned along at least one, but often several, vertical supports, such as pipes or angle irons. It is more beneficial to use two vertical supports when a heavy implement is employed that is positioned directly in front of the tractor. Conversely when a lighter implement is employed that is positioned in several locations to the front and side of the tractor, a single vertical support is more convenient.

Finally a provision occurs to allow means for adjusting said flexible dampening mechanism in stiffness to dampen vertical movements of said ground-based implement as said tractor traverses over rough ground. This changes the working stiffness of the setup to match the weight of the implement and to insure that unwanted vibrations do not occur. When properly dynamically tuned the flexible dampening mechanism will allow the implement to raise and lower and thus follow an approximately constant position with respect to the ground. In the torsional component this entails adjusting the amount of torsion associated with the normal operating equilibrium position. With springs the compression is likely changed by adjusting bolts. With a torsion bar, the size and initial tension of said bar is adjustable. With a rubber axial the amount of rubber material and its initial hardness is changeable.

An example of a typical implement is a mower device for cutting vegetation, including around vertical objects, comprising a chassis adapted with pivotal mounting on a transportable power system with positioning in front, or on either side of, said power system.

Then a plurality of substantially identical operational mower units utilizing said power system is employed, positioned horizontally in a compact assembly, attached to said chassis substantially by supports connected to a vertical member. If such member is concentrically positioned then at least one of said mower units operates at a different cutter rotational speed. If such member is unconcentrically positioned then idenical mower units are employable. The most common assembly is to employ tripartite mowing units or heads positioned in an equilateral triangular assembly so that the concentric vertical member passes through the centroid of the equilateral triangle. The mower heads all potentially operate at different mower blade speeds as well as in reverse directions. However the vertical member and blade speeds and blade directions are dynamically unbalanced so that the total assembly will spontaneously rotate, and this rotation is commonly adjusted by changing blade speeds and sizes. Therefore a variable drive mechanism is required to power each head of this assembly and is performable by various belts and pulleys if mechanical accomplished. Alternately electrical or hydraulic motors powers the mower heads but each is independently adjustable.

Additionally is used means for insuring rotatability of said compact assembly about said concentric vertical member while insuring all mower units retain their operating ability. A mechanism allowing powering of all heads must occur, but is undisturbed by total mower head assembly rotation. In a mechanical setup several alternatives occurs such as two independently rotating concentric shafts. However if electrical motors are employed, then some situation like slip rings or brushes is needed to feed electrical energy into a rotating system.

Finally means for braking said compact assembly from rotating is needed. This is potentially as simple as a friction brake to stop the rotation of the assembly of mower heads. The rotation is desired when mowing around fence posts, but for clear field mowing a fixed situation is more convenient so the brake is applied.

Figure 7:
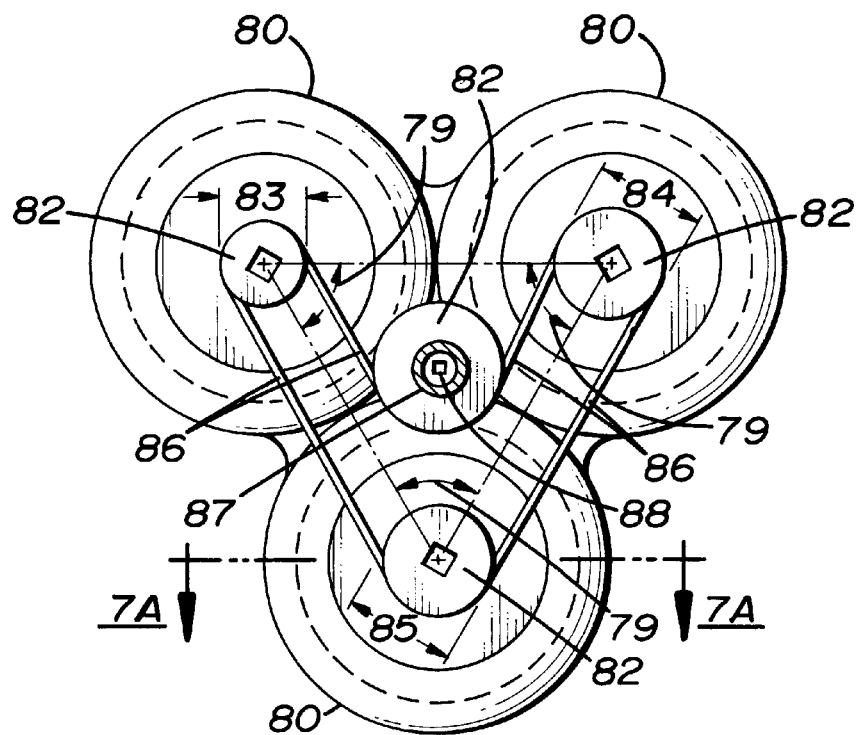
FIGS. 7 and 7A show a tripartite mower system for use around vertical objects.

FIG. 7 shows a tripartite mower head arrangement in an equilateral triangular array, since angles 79 are all sixty degrees, powered by a belt driven mechanism for convenience. Each mower head is a cover 80 over a cutting blade 81 which is attached to a ground spacer 90, shown in FIG. 7A. The driving belt 86 turns pulleys 82; however, the pulley diameters 83, 84, 85 are unequal. In FIG. 7 pulley diameter 83 is smaller than the other pulleys allowing its mower blade to turn slower which dynamically unbalances the torque on the mower arrangement forcing it to rotate about the concentric rod 88. In a further configuration the rotating rod 88 is placeable unconcentrically or off-center thus still maintaining an unbalalnced dynamic torque even if all mower units are completely identical. The powered pulley is attached to rotating shaft 87 whose conventional motor connection is not shown. Alternatively other power arrangement for the mower heads are possible such as hydraulic motors and electrical motors.

Figure 7A:
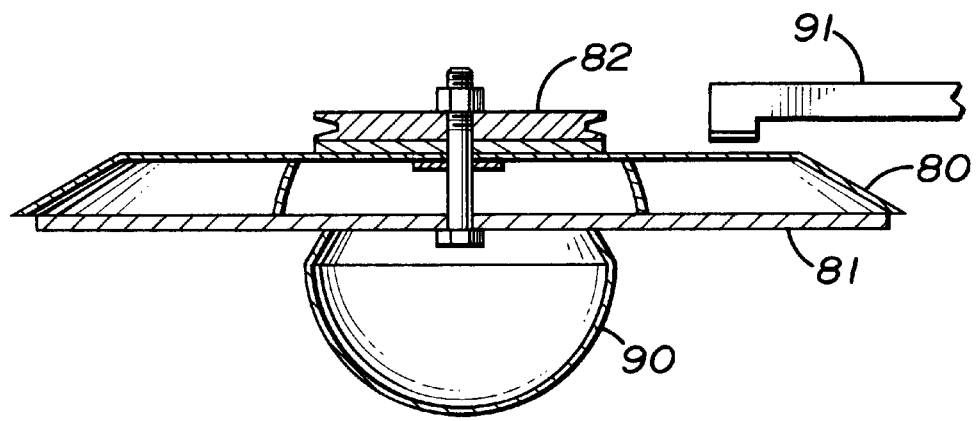

FIG. 7A shows a side view of a single mower head along cutaway A—A and further shows a braking mechanism 91 which allows the mower tripartite arrangement to lock into one position when not mowing around vertical objects. When vertical objects are encountered, such as a fence post, the brake is released and the tripartite revolving arrangement rotates around such a vertical object as the tractor passes by the object and so mows on all sides of it.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A hitch mounted on a tractor containing a power system for controlling a ground-based implement, comprising:

a longitudinally adjustable assembly, working in conjunction with said power system, which has sufficient capacity to handle movement of said ground-based implement, and which is structurally pivotally connected to said tractor; and means for providing a flexible dampening mechanism, which is stiffness adjustable, structurally connected between said longitudinally adjustable assembly and said ground-based implement.

2. The hitch according to claim 1 wherein said longitudinally adjustable assembly further comprises a hydraulic piston and cylinder mechanism.

3. The hitch according to claim 1 wherein said flexible dampening mechanism further comprises a stretchable load-bearing cover partially encompassing said longitudinally adjustable assembly, wherein the upper portion of said stretchable load-bearing cover is structurally attached to the boom of said longitudinally adjustable assembly.

4. The hitch according to claim 3 wherein said stretchable load-bearing cover further comprises a plurality of spiral springs.

5. The hitch according to claim 1 wherein said flexible dampening mechanism further comprises a torsional device structurally mounted between the boom of said longitudinally adjustable assembly and said ground-based implement.

6. The hitch according to claim 5 wherein said torsional device further comprises being selected from the group consisting of adjustable torsional bars, adjustable torsional springs, adjustable rubber torsional axials, and combinations thereof.

* * * * *